(No Model.)
F. A. MOORE.
FRUIT PICKER.
No. 292,936.
Patented Feb. 5, 1884.
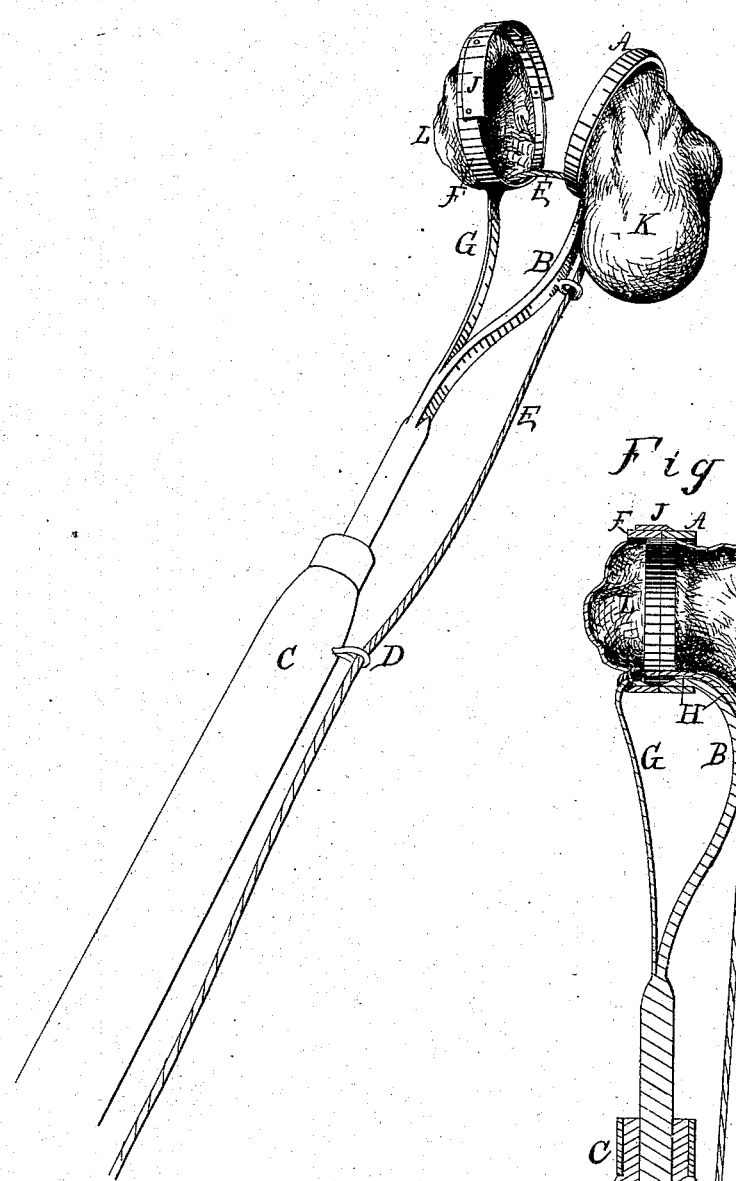
WITNESSES.
S. E. E. Stevens
P. E. Stevens.
INVENTOR
Frank A. Moore.
PER. W. L. Stevens
ATTY.

UNITED STATES PATENT OFFICE.

FRANK A. MOORE, OF LOUISVILLE, KENTUCKY.

FRUIT-PICKER.

SPECIFICATION forming part of Letters Patent No. 292,936, dated February 5, 1884.

Application filed October 15, 1883. (No model.)

*To all whom it may concern:*

Be it known that I, FRANK A. MOORE, a citizen of the United States, residing at Louisville, in the county of Jefferson and State of Kentucky, have invented certain new and useful Improvements in Fruit-Pickers; and I do hereby declare the following to be a full, clear, and exact description of the invention, such as will enable others skilled in the art to which it appertains to make and use the same.

My invention relates to that class of fruit-pickers used to gather one piece—such as an apple, a pear, an orange, a bunch of grapes, &c.—at a time; and it has for its object to provide a simple and inexpensive implement by means of which fruit may be gathered from trees and placed in a receptacle without injury.

To this end my invention consists in two hoops, a bag or net attached to each, a handle therefor, and means connected therewith for cutting or breaking fruit-stems, as hereinafter described and claimed, reference being had to the accompanying drawings, in which—

Figure 1 is a perspective view of my fruit-picker open ready to receive an apple or other fruit, and Fig. 2 is a transverse vertical section of the same closed.

A represents a metallic hoop, which may be circular, or of any other suitable form, attached to a stiff shank, B. This shank may be provided with a wooden handle or pole, C, of any suitable length, and have attached to it two or more rings, D, as guides for the cord E. This cord may be attached at one end to any portion of said handle within reach of the operator, and at the other end to another hoop, F. Said hoop F is secured to the shank by means of a spring-bar, G, which acts to throw the hoops apart, as in Fig. 1, while the cord running over a neatly-rounded bearing, H, in hoop A, being pulled by the operator, closes hoop F upon hoop A. Hoop F is provided with a cutting-blade, J, extending part or all the way around said hoop. This blade is sharp at its edge, and when the two hoops are closed together it shuts past the edge of hoop A, acting therewith like shears, by means of which the operator, by pulling the cord E, may cut off the stems which support the fruit, allowing said fruit to fall into the large net or bag K, which is secured at its open end to the circumference of hoop A. The opposite net L, secured to the circumference of hoop F, is to prevent the fruit when cut or pulled from its stem from falling out of the picker.

Instead of cutting the stems, as before described, the hoops may be nearly closed over the fruit by means of the cord, and so held while the fruit is pulled off by a movement of the picker.

For common fruit-picking the hoops will be about five inches across, and the bag K may be shallow enough so that the fruit may be readily tipped out; yet the bag in other cases may be extended down to the hand of the operator.

In practice the operator reaches the fruit to be picked with the hoops, closes them upon it, and cuts the stem by pulling the cord, then removes the fruit to the basket, which may stand about the length of the picker-handle from the operator for convenience. By this means fruits of all kinds growing on trees out of reach of hand may be rapidly and carefully picked without any especial care on the part of the operator, the picker wholly guarding the fruit from bruises. The bar G serves the double purpose of a hinge for the hoop to vibrate upon and a spring to throw the hoops apart, thus opening the mouth of the bag and maintaining it open ready for use until it is purposely closed by the operator. The shank B is attached to the hoop and bent in such a manner as to form the curved bearing shown at H, Fig. 2, for the cord to draw over.

I am aware that the following elements are not new in fruit-pickers, to wit: a hoop rigidly secured upon a shank, another hoop hinged to the first hoop by means of pivots, bags secured to said hoops, a separable spring independent of said hinge to act upon the hinged hoop, and a bifurcated cord passing outside of both hoops to close them; and I do not claim any of these features individually, nor any combination thereof, as my invention.

My fruit-picker has no pivoted hinges. It has no hinges independent of its spring. Its spring, shank, and both hoops are secured together as a unit, and it has no bifurcated cord, but its single cord acts centrally to draw the hoops directly together.

Having thus fully described my invention, what I claim, and wish to secure by Letters Patent, is—

In a fruit-picker, a bifurcated shank, one of the arms thereof being a spring-bar and the other curved, as described, in combination with two hoops, one being rigidly secured to each of said arms, a blade secured to one of said hoops, and a cord secured to one hoop, and passing through both hoops and over the curved shank, substantially as and for the purpose specified.

In testimony whereof I affix my signature in presence of two witnesses.

FRANK. A. MOORE.

Witnesses:
W. X. STEVENS,
JAMES MAXWELL.